US006544576B2

(12) United States Patent
Zeller et al.

(10) Patent No.: US 6,544,576 B2
(45) Date of Patent: Apr. 8, 2003

(54) COFFEE BEVERAGE PREPARATION AROMA SYSTEM

(75) Inventors: Bary L. Zeller, Glenview, IL (US); Anilkumar G. Gaonkar, Buffalo Grove, IL (US); Anthony Wragg, Banbury (GB); Stefano Ceriali, Banbury (GB)

(73) Assignee: Kraft Foods Holdings, Inc., Northfield, IL (US)

( * ) Notice: Subject to any disclaimer, the term of this patent is extended or adjusted under 35 U.S.C. 154(b) by 175 days.

(21) Appl. No.: 09/745,124

(22) Filed: Dec. 21, 2000

(65) Prior Publication Data

US 2002/0119235 A1 Aug. 29, 2002

(51) Int. Cl.⁷ .............................. A23F 5/00; A23F 5/46
(52) U.S. Cl. ........................................ 426/594; 426/651
(58) Field of Search ................................. 426/594, 651

(56) References Cited

U.S. PATENT DOCUMENTS

| | | | | |
|---|---|---|---|---|
| 3,989,852 A | | 11/1976 | Palmer ........................ 429/289 |
| 4,156,031 A | * | 5/1979 | Hamell et al. |
| 4,188,409 A | * | 2/1980 | Kay |
| 4,267,200 A | * | 5/1981 | Klien et al. |
| 4,311,720 A | | 1/1982 | Marmo et al. .............. 426/594 |
| RE31,427 E | * | 10/1983 | Lubsen et al. |
| 4,517,120 A | * | 5/1985 | Roychoudhury |
| 4,520,033 A | | 5/1985 | Tuot ............................. 426/96 |
| 4,695,473 A | | 9/1987 | Pittet et al. ................. 426/535 |
| 4,871,564 A | * | 10/1989 | Stoeckli et al. |
| 4,931,304 A | | 6/1990 | Sharma ....................... 426/632 |
| 5,229,153 A | * | 7/1993 | Blane |
| 5,342,639 A | * | 8/1994 | Cormaci |
| 5,399,368 A | | 3/1995 | Garwood et al. ............ 426/307 |
| 5,496,574 A | | 3/1996 | Rushmore et al. ............. 426/98 |
| 5,576,044 A | | 11/1996 | Chmeil et al. ............... 426/594 |
| 5,744,182 A | | 4/1998 | Andersson .................. 426/316 |
| 5,750,178 A | | 5/1998 | Cheng et al. ................ 426/594 |
| 5,882,716 A | * | 3/1999 | Munz-Schaerer et al. |
| 5,976,514 A | | 11/1999 | Guskey et al. ................. 424/65 |

FOREIGN PATENT DOCUMENTS

JP 497547 * 5/1992

* cited by examiner

Primary Examiner—Anthony J. Weier
(74) Attorney, Agent, or Firm—Larson & Taylor, PLC

(57) ABSTRACT

A coffee aroma composition and a particulate coffee beverage preparation aroma composition. The aroma composition includes a coffee aroma constituent and a volatile organic carrier constituent. The carrier is in the liquid state at 25° C., and has a vapor pressure of at least 0.01 mm Hg at 25° C., a boiling point in the range of 25 to 250° C., a density of less than 1.0 g/cc, and water solubility of not more than about 10% by weight at 25° C.

52 Claims, No Drawings

COFFEE BEVERAGE PREPARATION AROMA SYSTEM

FIELD OF THE INVENTION

The invention relates to compositions for providing aroma at the time of preparation of a coffee beverage, and to particulate soluble coffee product compositions containing such coffee beverage preparation aroma compositions.

BACKGROUND OF THE INVENTION

The production of soluble, or instant, coffee powder involves processing conditions such as elevated temperature, which causes loss of desirable coffee aroma. Unless additional steps are taken in its manufacture, there is very little aroma associated with hot coffee beverages prepared from instant coffee powder relative to the aroma of hot coffee beverages prepared by brewing roast and ground coffee. Many attempts have been made to enhance the aroma of instant coffee products, including the use of particular types of coffee beans, the use of particular coffee roasting conditions, and the addition of coffee aroma. The present invention relates to the addition of coffee aroma to instant coffee and, in particular, to such addition which results in a burst of preparation aroma.

It is known to prepare natural and artificial coffee aromas and flavors for addition to instant coffee. Such aromas and flavors are usually complex, comprising many organoleptically active compounds, which combine in effect to create the characterizing aroma of the product. Since aromas and flavors are extremely powerful and typically unstable in their undiluted state they are combined with a carrier to render them stable and easier to handle. The carriers are neutral or complementary in organoleptic impact and do not contribute to the characterizing aroma of the product.

Carriers can be water-soluble solids or liquid. In cases where a liquid carrier is used, it is often encapsulated in a solid, water-soluble matrix to further preserve the characterizing aromas from loss or damage. The carrier, often referred to as a solvent in liquid systems, functions as an aroma base and is used to adjust the level of otherwise powerful aroma and taste substances to levels similar to those that exist in nature. Desirable characteristics of carriers for liquid systems include blandness and miscibility with other liquid carriers and with liquid aromas. Traditional liquid carriers include ethanol, propylene glycol, glycerol, vegetable oil, benzyl alcohol, triacetin, tripropionin, triethyl citrate, and tributyrin.

The aroma constituent of an aromatizing composition characterizes its aroma, i.e., the innate quality that gives the aroma its special attributes among and over other aromas. The aroma constituent may, and often does, include a plurality of aroma ingredients which together result in the characterizing aroma.

When a preparation aroma is desired upon rehydration of such flavors and aromas in a dehydrated food or beverage such compositions are limited in effectiveness because of poor aroma release. When a solid carrier is used, the release or aroma is poor because the diffusion of rehydrating liquid into the particle during rehydration inhibits the counter-diffusion of aroma out. In this way, the vast majority of the characterizing aroma constituents end up in the rehydrating liquid. An aroma burst can be obtained by increasing the loading of characterizing aroma constituents into the carrier but this typically leads to an overwhelmingly strong or unbalanced flavor in the product when consumed.

Likewise poor aroma release is obtained when traditional liquid carriers are used, whether or not they are encapsulated. Those which are water-soluble suffer the same problems as with soluble solid carriers. The flux of water into the carrier inhibits the diffusion of the aromas out. Furthermore, many carriers have a density greater than 1.0 g/cc so they sink in the product during hydration and aromas are released into the rehydration liquid rather than being released at the surface to effect preparation aroma. Finally, those conventional carriers which do float and are insoluble in water are of an oily or fattynature. Though these can be arranged to release aroma at the surface they leave an unsightly and often organoleptically and visually undesirable "slick" at the surface of the product.

A particular problem which has been noted in connection with instant coffee is the relative lack of coffee aroma that is generated at the time that a hot instant coffee beverage is prepared compared to the coffee aroma that is generated when brewing coffee. This problem of poor preparation aroma (i.e., poor aroma burst or "above-cup aroma" at the time of preparation of an instant coffee beverage) is noted in U.S. Pat. No. 5,399,368 assigned to Nestec S. A. and in U.S. Pat. No. 5,750,178 also assigned to Nestec S. A. Each of these patents describes several prior art attempts to provide an initial burst of above-cup coffee aroma, such as by coating soluble coffee powder with an aqueous emulsion of an aromatic coffee substance, or by employing particulate aromatized coffee glass. It is reported in each of these U.S. patents that these and other previously known procedures had not been successful in achieving good preparation aroma. The '368 patent proposes a method of coextruding capsule particles in which a liquid core material containing aromatized coffee oil is encapsulated within a shell of hardened coffee glass. The shell encapsulates a core of aromatized coffee oil saturated with an inert gas under pressure. The '178 patent also describes known techniques for aromatizing instant coffee and notes that techniques which may provide good package aroma (i.e., aroma in a coffee container) do not provide good preparation aroma. The '178 patent reports that the method of the '368 patent provides excellent entrapment of the aroma but that complex machinery and careful control are required. The '178 patent proposes a modified method of preparing the aromatized coffee capsule particles which method is said to have the advantage of simplicity.

The amount of preparation aroma which can be achieved by incorporating aromatized coffee particles, such as those described in the '368 and '178 patents, in an instant coffee product, depends in part on the amount of such particles employed. Good preparation aroma can be achieved by employing a sufficient amount of the aromatized capsules. However, the more capsules that are employed, the more capsule material, particularly coffee oil, that is introduced. The added coffee oil accumulates as an oil film on the surface of the coffee beverage. Such oil films are readily apparent and are widely known to impair consumer acceptance of instant coffee.

A need arises to provide soluble coffee product compositions with good coffee preparation aroma without requiring the use of amounts of other ingredients, such as vegetable oils, that would adversely affect the properties of coffee beverages prepared from the aromatized coffee product compositions.

SUMMARY OF THE INVENTION

In one aspect, the invention provides a particulate coffee aroma composition comprising a coffee aroma constituent and a volatile organic carrier constituent, said volatile organic carrier constituent being in the liquid state at 25° C. and atmospheric pressure, and having a vapor pressure of at least 0.01 mm Hg at 25° C., a boiling point in the range of 25 to 250° C., a density of less than 1.0 g/cc at 25° C., and water solubility of not more than about 10% by weight at 25° C.

In a further aspect, the invention provides a particulate coffee beverage preparation aroma composition comprising particles having a solid water soluble matrix, said matrix having physically entrapped therein a coffee aroma composition, said coffee aroma composition comprising a coffee aroma constituent and a volatile organic carrier constituent, said volatile organic carrier constituent being in the liquid state at 25° C. and atmospheric pressure, and having a vapor pressure of at least 0.01 mm Hg at 25° C., a boiling point in the range of 25 to 250° C., a density of less than 1.0 g/cc at 25° C., and water solubility of not more than about 10% by weight at 25° C.

In a still further aspect, the invention provides a particulate soluble coffee product composition containing a particulate coffee beverage preparation aroma composition, said particulate coffee beverage preparation aroma composition comprising particles having a solid water soluble matrix, said matrix having physically entrapped therein a coffee aroma composition, said coffee aroma composition comprising a coffee aroma constituent and a volatile organic carrier constituent, said volatile organic carrier constituent being in the liquid state at 25° C. and atmospheric pressure, and having a vapor pressure of at least 0.01 mm Hg at 25° C., a boiling point in the range of 25 to 250° C., a density of less than 1.0 g/cc at 25° C., and water solubility of not more than about 10% by weight at 25° C.

DETAILED DESCRIPTION OF PREFERRED EMBODIMENTS

The release of aroma during food of an instant coffee beverage affects the desirability and enjoyment of the beverage. The intensity of preparation aroma can significantly impact the consumer's perception of coffee freshness and quality. Heightened coffee preparation aroma intensity can usually be achieved by simply increasing the amount of volatile aroma formulated into a soluble coffee product composition. However, the normal amount must typically be increased many fold to produce a noticeable effect on preparation aroma. Unfortunately, this approach often leads to a coffee beverage having overwhelmingly strong taste or aroma during consumption. The present invention provides a more intense preparation aroma while seeking to avoid deleterious effects on quality. In one embodiment, a coffee aroma composition may be used to provide the consumer with two distinct and desirable aroma experiences. Intense aroma, derived from the high release efficiency of the novel aroma system described herein, may be perceived during coffee beverage preparation, and normal-strength aroma and flavor, more typical of widely used low release efficiency conventional aroma systems, may be perceived during subsequent consumption.

The invention combines a volatile coffee aroma with a volatile, organic carrier to create a volatile coffee aroma composition which provides a good initial burst of coffee aroma at the time of preparation of a coffee beverage, while avoiding the problems noted above of residual surface oil and strong taste or aroma during consumption. The use of a novel volatile carrier, having the present combination of physical properties is key to the present invention and clearly distinguishes the present coffee aromatizing composition from flavoring agents, either natural or artificial, which utilize traditional carriers. Traditional carriers are either too water soluble, have density greater than 1 g/cc, or are not sufficiently volatile to provide the preparation aroma impact desired while avoiding oily surface residues and potentially adverse effects on flavor. The volatile aromatizing composition is biphasic with water and has a temporary existence at the temperature of coffee beverage preparation. This creates a beneficial non-equilibrium environment in which both the aroma and carrier evaporate from floating oil-like droplets that will disappear from the surface of a coffee beverage, particularly those prepared by combining an aqueous liquid such as water or milk with a particulate dehydrated soluble coffee product composition. The volatile aromatizing composition is physically entrapped, preferably by encapsulating, in solid, water soluble particles to reduce evaporation and oxidation during storage. The particulate aroma composition is readily incorporated into and packaged with particulate soluble coffee product compositions. The volatile aromatizing composition may also be utilized in other ways such as in coffee beverage vending machines in which coffee beverages are prepared from liquid coffee concentrates or from soluble coffee powder. In such vending machines, the present volatile preparation aroma composition is preferably held in and dispensed from a separate container which is sealed to minimize oxidation and evaporation of the composition. Such containers may hold a quantity of the composition suitable for a single serving or for a plurality of servings.

The use of the present volatile organic carriers may provide several advantages. Since the volatile organic carrier is at most sparingly water-soluble and has a density less than the density of water, it will float to the surface of coffee beverages, where it can release aroma directly into the air above the beverage product at the time that it is prepared. This effect is desirable since it will serve to minimize loss of coffee aroma by dissolution, and to maximize the intensity of coffee aroma perceived by the consumer. Also, since volatile carriers rapidly evaporate along with the aroma, they do not leave behind an undesirable oil slick on the surface of the coffee beverage as occurs in applications that utilize non-volatile carriers such as coffee oil or other triglyceride oil.

Volatile carriers typically also have much lower freezing point and viscosity than edible oils, typically vegetable oils, which allow them to be aromatized by direct contact with cold or frozen coffee aromas. An example is contact of the carrier with a coffee aroma frost. Aromatization at low temperature can be advantageous to reduce loss of very volatile aromas by evaporation and to reduce loss of labile aromas by thermal or oxidative degradation. Other solvents that have lower freezing points than edible oils, such as triacetin, benzyl alcohol, propylene glycol, or ethanol, typically have high water solubility and/or density greater than water, properties that will tend to reduce initial aroma burst. Another advantage is that the volatile organic carriers may be used as a solvent to extract coffee aroma directly from natural sources. They can then be easily distilled and condensed to facilitate concentration or fractionation of aromas.

The invention has particular utility in providing good above-cup aroma in the preparation of a hot aqueous coffee beverage, such as instant coffee, cappuccino and flavored instant coffee products from a powdered instant coffee beverage product composition without adversely affecting other properties of the beverage. Such beverages are generally prepared by combining the coffee product powder composition with hot water or milk at elevated temperature, typically at about 75–100° C., usually at about 85–100° C. For such particulate coffee product compositions, the aroma composition is physically entrapped in solid, water-soluble particles.

It is an essential feature of the invention that the coffee aroma composition includes a volatile organic carrier for the coffee aroma that is volatile at the temperature of food preparation. More than one such carrier may be employed. The carrier has a vapor pressure of at least 0.01 mm Hg at 25° C. and a boiling point in the range of from 25° C. to 250° C., and is in liquid state at 25° C. and atmospheric pressure. Accordingly, the carrier can be vaporized at coffee beverage preparation temperatures. The carrier preferably has a vapor pressure of at least 0.5 mm Hg at 25° C., more preferably at least 2.0 mm Hg at 25° C., and most preferably at least 5.0 mm Hg at 25° C. For hot coffee beverages, preferred carriers have a boiling point in the range of 25–200° C., and more preferred carriers have a boiling point in the range of 25–100° C. For cold coffee beverages prepared at room temperature or below, preferred carriers have a boiling point in the range of 25–50° C.

Density of the carrier is sufficiently low to enable droplets of the aromatized carrier to float on the surface of coffee beverages in order to enhance the aroma burst. Carrier density values herein are at 25° C. unless otherwise stated. Carrier density is suitably at least 0.6 and less than 1.0 g/cc, preferably from 0.7 to 0.99 g/cc, and more preferably from 0.8 to 0.95 g/cc.

Water solubility of the carrier is preferably sufficiently low to minimize loss of aroma burst due to dissolution of the carrier into an aqueous liquid utilized to prepare the coffee beverage. However, in many instances a good coffee aroma burst can be obtained when the carrier is partially water soluble. For example, a good aroma burst can often be achieved with such carriers when the aromatized particles float, particularly if the absolute density of the floating particles is not more than about 0.95 g/cc. In general, water solubility of the carrier is not greater than about 10% at 25° C., and is preferably not greater than about 5% at 25° C. Most preferably, the carrier is water insoluble.

Suitable volatile carriers include the following:

| Insoluble Novel Volatile Carriers | Vapor Pressure* (mm Hg) | Density (g/cc) | Boiling Point (° C.) | Freezing Point (° C.) | Water Solubility | Chemical Classification |
|---|---|---|---|---|---|---|
| 2-methylfuran | ~260 | 0.91 | 63 | −89 | insoluble | furan |
| 2,5-dimethylfuran | ~50 | 0.90 | 92 | −62 | insoluble | furan |
| 2-ethylfuran | ~50 | 0.91 | 92 | <−70 | insoluble | furan |
| isobutyl propionate | ~6.2 | 0.87 | 137 | −71 | insoluble | ester |
| methyl hexanoate | ~4.0 | 0.89 | 151 | −71 | insoluble | ester |
| ethyl hexanoate | ~1.5 | 0.87 | 168 | −67 | insoluble | ester |
| heptyl acetate | ~0.4 | 0.86 | 192 | −50 | insoluble | ester |
| methyl octanoate | ~2.7 | 0.88 | 195 | −40 | insoluble | ester |
| heptyl acetate | ~0.4 | 0.88 | 193 | −50 | insoluble | ester |
| ethyl octanoate | ~0.3 | 0.88 | 209 | −47 | insoluble | ester |
| octyl acetate | ~0.6 | 0.87 | 199 | −80 | insoluble | ester |
| methyl decanoate | ~0.04 | 0.87 | 224 | −18 | insoluble | ester |
| methyl undecanoate | ~0.03 | 0.89 | 248 | | insoluble | ester |
| heptyl butanoate | ~0.05 | 0.86 | 226 | −58 | insoluble | ester |
| ethyl decanoate | ~0.04 | 0.86 | 245 | −20 | insoluble | ester |
| heptanal | ~2.5 | 0.82 | 153 | −43 | insoluble | aldehyde |
| octanal | ~2.4 | 0.83 | 173 | −12 | insoluble | aldehyde |
| nonanal | ~0.6 | 0.83 | 191 | | insoluble | aldehyde |
| decanal | ~0.2 | 0.83 | 210 | −5 | insoluble | aldehyde |
| 1-heptanol | ~0.2 | 0.82 | 175 | −35 | insoluble | aliphatic alcohol |
| 1-octanol | ~0.05 | 0.83 | 195 | −16 | insoluble | aliphatic alcohol |
| 2-octanol | ~0.5 | 0.82 | 179 | −39 | insoluble | aliphatic alcohol |
| 1-nonanol | ~0.2 | 0.83 | 215 | −6 | insoluble | aliphatic alcohol |
| 2-pentanone | 37 | 0.81 | 102 | −77 | insoluble | ketone |
| 3-heptanone | ~3.7 | 0.82 | 149 | −39 | insoluble | ketone |
| 3-octanone | ~2.5 | 0.82 | 168 | | insoluble | ketone |
| 2-nonanone | ~0.4 | 0.83 | 196 | −7 | insoluble | ketone |
| p-cymene | 1.4 | 0.85 | 178 | −69 | insoluble | monoterpene hydrocarbon |
| myrcene | ~2.5 | 0.79 | 167 | | insoluble | monoterpene hydrocarbon |
| d-limonene | 2.1 | 0.84 | 175 | −74 | insoluble | monterpene hydrocarbon |
| l-limonene | ~1.8 | 0.84 | 176 | | insoluble | monoterpene hydrocarbon |
| dipentene | ~2.0 | 0.84 | 176 | −95 | insoluble | monoterpene hydrocarbon |
| terpinolene | ~0.7 | 0.86 | 185 | | insoluble | monoterpene hydrocarbon |
| o-pinene | 4.8 | 0.86 | 155 | −64 | insoluble | monoterpene hydrocarbon |
| π-pinene | 4.6 | 0.87 | 167 | −61 | insoluble | monoterpene hydrocarbon |
| o-phellandrene | ~2.0 | 0.85 | 172 | | insoluble | monoterpene hydrocarbon |
| π-phellandrene | ~1.8 | 0.85 | 172 | | insoluble | monoterpene hydrocarbon |
| isoprene | ~580 | 0.68 | 34 | −147 | insoluble | hydrocarbon |
| n-pentane | 512 | 0.62 | 36 | −130 | insoluble | hydrocarbon |
| n-hexane | ~225 | 0.66 | 69 | −95 | insoluble | hydrocarbon |
| n-heptane | 46 | 0.68 | 98 | −91 | insoluble | hydrocarbon |
| n-octane | 14 | 0.70 | 126 | −57 | insoluble | hydrocarbon |
| n-nonane | ~3.5 | 0.72 | 151 | −51 | insoluble | hydrocarbon |
| n-decane | ~1.8 | 0.73 | 174 | −30 | insoluble | hydrocarbon |
| n-undecane | ~0.4 | 0.74 | 196 | −26 | insoluble | hydrocarbon |
| dibutyl ether | 12.5 | 0.76 | 142 | −98 | insoluble | ether |

-continued

| | | | | | | |
|---|---|---|---|---|---|---|
| ethyl propyl ether | ~210 | 0.74 | 64 | −79 | insoluble | ether |
| dipentyl ether | ~1.1 | 0.78 | 190 | −69 | insoluble | ether |

| Slightly Soluble Novel Volatile Carriers | Vapor Pressure* (mm Hg) | Density (g/cc) | Boiling Point (° C.) | Freezing Point (° C.) | Water Solubility | Chemical Classification |
|---|---|---|---|---|---|---|
| ethyl formate | ~240 | 0.92 | 54 | −79 | slight (8%) | ester |
| ethyl acetate | 94 | 0.90 | 77 | −84 | slight (8%) | ester |
| propyl formate | ~82 | 0.90 | 82 | −93 | slight (2%) | ester |
| methyl propionate | ~86 | 0.91 | 80 | −87 | slight (5%) | ester |
| ethyl propionate | ~37 | 0.89 | 99 | −74 | slight (1%) | ester |
| propyl acetate | 34 | 0.89 | 102 | −93 | slight (1%) | ester |
| isopropyl acetate | 61 | 0.87 | 89 | −73 | slight (4%) | ester |
| isobutyl formate | ~42 | 0.88 | 99 | −96 | slight (1%) | ester |
| isobutyl acetate | ~20 | 0.87 | 117 | −99 | slight (1%) | ester |
| ethyl butanoate | ~17 | 0.88 | 120 | −93 | slight (1%) | ester |
| methyl pentanoate | ~14 | 0.88 | 128 | | slight | ester |
| n-butyl acetate | 12.4 | 0.88 | 126 | −78 | slight (1%) | ester |
| propyl butanoate | ~5.7 | 0.87 | 143 | −97 | slight | ester |
| isobutyl butanoate | ~4.0 | 0.86 | 158 | | slight | ester |
| isobutyl isobutanoate | ~4.5 | 0.83 | 157 | −81 | slight | ester |
| methyl heptanoate | ~1.4 | 0.87 | 173 | −56 | slight | ester |
| 2-methylpropanal | ~250 | 0.79 | 64 | −66 | slight (8%) | aldehyde |
| 3-methylbutanal | ~40 | 0.78 | 92 | −51 | slight | aldehyde |
| hexanal | ~15 | 0.82 | 128 | −56 | slight | aldehyde |
| pyrrole | 8.2 | 0.97 | 130 | −23 | slight | pyrrole |
| 1-butanol | 6.4 | 0.81 | 118 | −90 | slight (7%) | aliphatic alcohol |
| 1-pentanol | 1.9 | 0.81 | 138 | −79 | slight (3%) | aliphatic alcohol |
| 1-hexanol | ~1.0 | 0.82 | 157 | −52 | slight (8%) | aliphatic alcohol |
| 2-heptanone | ~2.5 | 0.82 | 151 | −35 | slight | ketone |
| 2-octanone | ~1.0 | 0.82 | 172 | −16 | slight | ketone |
| methyl propyl ether | ~455 | 0.73 | 39 | | slight (4%) | ether |
| dipropyl ether | ~70 | 0.74 | 91 | −122 | slight (1%) | ether |

*Includes values reported in the literature and estimates based on available data. Vapor pressure, density and water solubility (weight %) reported at 25° C. Not all compounds listed are approved for food use.

The volatile carriers suitable for this invention are preferably bland, but may have an inherent aroma. The amount of aroma generated by the carrier is generally small relative to the aroma generated by the coffee aroma constituent of the volatile aroma system of the invention. In some cases, the inherent aroma of the carrier will be essentially undetectable. In any event, inherent aroma of a volatile carrier may be reduced by conventional deodorizing techniques such as by adsorption, extraction, or distillation. However, it is possible to select a volatile carrier which has an inherent aroma which is appropriate for a coffee beverage prepared from the coffee beverage product composition in which the carrier is utilized. For example, furan and a variety of alkyl substituted furans such as 2-methylfuran, 2-ethylfuran, and 2,5-dimethylfuran occur naturally in coffee at extremely low levels in combination with a wide variety of other compounds, and, when obtained from coffee, have inherent coffee compatible aroma. These furans do not occur naturally in coffee in sufficient quantity to be used economically as volatile carriers, but they can be readily obtained from other sources. A carrier with a fruity aroma, such as non-deodorized d-limonene which has a mild citrus aroma, is a suitable carrier for aromas for dehydrated fruit-flavored coffee beverage products.

The amount of carrier in the aromatizing composition may vary widely. In general, the carrier is present in an amount of at least 25% by weight, based on the total weight of the carrier and the coffee aroma constituent. Ordinarily, the amount of carrier will exceed 35% by weight on the same basis and will often exceed that of the coffee aroma constituent such that it will be present in an amount of more than 50% by weight based on the total weight of the carrier and the coffee aroma constituent. Correspondingly, the amount of the coffee aroma constituent may also vary widely, suitably up to 65 or 75% by weight based on the total weight of the carrier and coffee aroma constituent and will often be present in an amount of less than 50% by weight on the same basis.

The essential coffee aroma constituent of the aroma composition may be any one or more natural or artificial coffee aromas. Preferred coffee aromas include natural coffee aroma gas, liquid or frost obtained from coffee processing. The aroma composition may also include other natural or artificial aroma compounds suitable for coffee beverages such as hazelnut, amaretto, chocolate, cream, vanilla, etc.

The aroma constituents can be incorporated into the coffee aroma composition in any convenient way such as by simple mixing with the carrier. The aroma constituent is usually in a liquid or solid state but may be gaseous. The aroma constituent preferably is or includes coffee aroma derived from coffee aroma frost obtained from coffee processing. It is a distinct advantage of the invention that because the volatile carriers generally have a low freezing point, the carrier can be aromatized without heating to an elevated temperature. This is advantageous because coffee aroma is generally adversely affected by higher temperatures. The ability to aromatize without raising temperature above ambient is particularly advantageous in connection with coffee products because it permits aromatization of a liquid carrier by simply introducing coffee aroma frost into the carrier at room temperature or at a lower temperature down to the melting point of the aroma frost.

The coffee aroma is preferably soluble in the carrier. Where the aroma is not completely soluble, one or more suspending agents, emulsifiers, or co-solvents may be included to form a homogenous mixture. As used herein, the term "mixture" as applied to the coffee aroma composition, is intended to include compositions in which the coffee aroma constituent is dissolved, suspended, or emulsified.

The coffee aroma compositions of the present invention have particular utility in aromatizing soluble coffee product compositions. The expression "soluble coffee product compositions" as used herein means liquid and particulate products containing soluble coffee and which are intended for preparation of a coffee flavored beverage by the addition of water or an aqueous liquid such as milk. However, aromatizing agents of the invention can be used to aromatize other coffee-flavored products, such as instant puddings and other desserts that would normally be reconstituted with hot water or milk or heated by the consumer prior to consumption.

The coffee aromatizing composition may also include a minor amount of one or more optional constituents such as a non-coffee aroma, a non-volatile edible fat or oil, a surfactant, a wetting agent, a foaming agent, an extremely volatile solvent, a propellant, dissolved edible solids, an antioxidant, or an aroma precursor. Although greater amounts may be used, the total amount of such additional constituents will not usually be more than about 100%, and preferably not more than about 40% by weight, based on the total weight of the carrier and coffee aroma constituent. Suitable non-volatile edible fats or oils include coffee oil or other predominantly triglyceride oil used as a source of flavor or as a flavor solvent. A surfactant acts as a spreading agent or emulsifier to control the droplet size of the aromatizing composition and its degree of spreading on the surface of a food product. Suitable highly volatile solvents such as acetone and acetaldehyde act as a co-solvent for the volatile food aroma and modify the rate of evaporation of the aroma delivery system. A dissolved or entrapped propellant gas such as air, nitrogen, carbon dioxide, nitrous oxide, and the like, or a gas generator such as chemical carbonation reagents, may be included to increase buoyancy or to accelerate aroma release and evaporation. Dissolved edible solids increase the viscosity of the aroma composition. Antioxidant additives such as BHA, BHT, TBHQ, vitamins A, C and E and derivatives, and various plant extracts such as those containing carotenoids, tocopherols or flavonoids having antioxidant properties, may be included to increase the shelf-life of the aromatized carrier. Aroma precursors that would not react during storage but would react to generate aroma during food preparation may also be included in the aromatizing composition.

The nature and amount of each optional ingredient that is included in the aromatizing composition is also dependent on the food product intended to be aromatized. For example, where a coffee oil or aromatized coffee oil is selected as an optional ingredient, the amount of such coffee oil is preferably less than an amount that would give rise to an undesirable film of oil on the surface of the instant coffee beverage.

To facilitate floating of particles of the aromatizing composition on the surface of an aqueous beverage, density of the composition is preferably suitably from 0.6 up to less than 1.0 g/cc and preferably from 0.7 to 0.99 g/cc, and more preferably from 0.8 to 0.95 g/cc.

Although substantially limited by the physical properties of the carrier, the aromatizing compositions of the present invention may be formulated in a variety of ways. For example, natural or artificial coffee flavoring agents, or mixtures thereof, may be used in combination with natural or synthetic carriers, or mixtures thereof, depending on the intended food or beverage product application and availability and cost of the ingredients. Some of the novel carriers disclosed can be obtained from natural, typically botanical sources, while others can only be obtained from synthetic, typically petroleum, sources. The same applies to the flavoring agents which are combined with the carriers.

The aromatizing composition may be bottled or otherwise packaged in a sealed container, such as a container suitable for a coffee beverage vending machine, but is preferably physically entrapped in solid particles to protect the volatile carrier and volatile aroma from evaporation and deterioration. The aromatizing composition is preferably physically entrapped in solid particles by encapsulation, but may be simply absorbed such as by combining with an absorbent powdered food ingredient such as maltodextrin, or otherwise physically entrapped. Encapsulation is preferred because of the enhanced protection against evaporation and oxidation inherent in encapsulation. Encapsulation or other physical entrapment may be accomplished by any conventional technique, including those discussed in U.S. Pat. Nos. 5,339,368 and 5,750,178 mentioned above, the disclosure of each of which is herein incorporated by reference. A useful encapsulation technique is described in U.S. Pat. No. 4,520,033 and in Example 5 below. Other suitable encapsulation techniques are described in U.S. Pat. Nos. 5,496,574, and 3,989,852, the disclosure of each of which is incorporated by reference herein.

In general, any method of physical entrapment can be used that is effective in converting the coffee aroma composition into particulate form. Preferred methods include co-extrusion, centrifugal co-extrusion, submerged nozzle co-extrusion, and the like which can be employed to produce a particulate containing a single continuous droplet of the coffee aroma composition, the size of which can be controlled to optimize evaporation characteristics. Less preferred methods include extrusion, spray drying, freeze-drying, absorption, adsorption, granulation, fluidized bed coating, inclusion complexation, and liposome entrapment. Any particulate produced by these methods that have undesirably small particle size or that contain finely emulsified and dispersed droplets may be advantageously agglomerated or granulated to increase the size and buoyancy of the particulate or to modify its dissolution rate in a coffee beverage.

The encapsulating material or the matrix material making up the solid particles into which the carrier is adsorbed, may be any water soluble food grade material. Preferred water soluble encapsulation and matrix materials include soluble coffee solids, soluble tea solids, sugars, hydrolyzed starch products such as maltodextrins and corn syrup solids, hydrocolloids, and hydrolyzed proteins, as well as mixtures of these materials.

The particle size of the particulate aroma composition can vary widely. For most dehydrated food and beverage compositions, the particle size is suitably 0.1–10 mm, preferably 0.5–5 mm, and more preferably 1–3 mm.

For coffee beverage products, density of the particulate aroma composition is preferably sufficiently low to enable the particles to float in order to enhance the aroma release. However, in many instances a good aroma burst may be obtained for coffee beverages when density of the aromatized particles is greater than that of water. For example, a good aroma burst can often be obtained with such particles when a hot liquid is poured into a particulate coffee beverage composition, or when the density of the particulate coffee aroma composition or of the carrier is sufficiently low to enable the particles or the carrier to rise very rapidly to the surface of the hot liquid. For coffee beverage products, absolute density of the aromatized particles, which determines if the particles will float in water, is preferably from about 0.2 to 0.99 g/cc, more preferably from 0.3 to 0.95 g/cc and still more preferably from 0.4 to 0.9 g/cc, and bulk density, which determines packing efficiency and is affected by particle size and shape, is preferably from 0.1 to 0.9 g/cc, more preferably from 0.2 to 0.8 g/cc, and more still preferably 0.3 to 0.7 g/cc. For non-beverage products, the absolute density of the aromatized particles may be higher than the density of water since the ability of the particles to float is not important. Similarly, their bulk density may be greater than 1.0 g/cc.

Bulk density of the particulate aroma composition is determined by pouring about 2–3 mL of the particles into a 10 mL graduated cylinder, vibrating until no further settling takes place, accurately noting both weight and volume and dividing the former by the latter to calculate bulk density to two decimal places. Absolute density is determined by adding very fine sand to the particles remaining in the cylinder after bulk density measurement and vibrating until all void spaces between the aromatized particles are filled with sand and no further settling takes place. The absolute density of the sand was first measured by filling a 10 mL cylinder with sand in the absence of aromatized particulates, vibrating until no further settling took place, accurately noting both weight and volume. The absolute density of the sand was calculated by dividing weight by volume to give a value of 1.66 g/cc. Knowledge of the absolute density of sand, individual weights of sand and particulates in the cylinder, and measurement of the volume and weight of the sand-particulate mixture allows calculation of the absolute density of the particles. Increased buoyancy can be obtained by gasifying the carrier, the solid matrix material, or both.

The amount of coffee aroma composition present in the particulate coffee beverage preparation aroma composition can vary considerably, but is generally maximized because it is generally the aroma constituent, and not the solid encapsulant or matrix that is desired to be incorporated into the food product. The aromatizing composition is preferably present in an amount of from about 1 to about 95% and more preferably from 10 to about 80% by weight based on the weight of the particulate aromatizing composition. However, where the solid encapsulant or matrix material is coffee-derived—such as where the solid particle is soluble coffee—the amount of solid material can be much larger. This can be very advantageous, e.g., in facilitating processing such as encapsulation. For such coffee beverage products, the amount of coffee-derived solid material in the particulate aromatizing composition is suitably up to 95 or 99% by weight.

It is preferred, for simplicity, to utilize a single volatile carrier, but more than one may be employed in which case it is preferred that the selected carriers are miscible with one another. On the other hand, the coffee aroma constituent is often made up of a plurality of aroma compounds as illustrated in the examples below.

The amount of the particulate coffee beverage preparation aroma composition suitable for incorporation into a particulate soluble coffee beverage product composition can vary widely, depending on several factors including the nature of the coffee product composition, the nature and strength of the volatile coffee aroma, the nature and inherent aroma of the volatile carrier, and the nature and amount of the solid entrapping material and of any extraneous material. In general, the amount added is sufficient to provide good coffee preparation aroma. In some cases, the particulate soluble coffee product composition can be made up entirely of the particulate coffee aroma composition. For example, a furan carrier liquid, aromatized with a coffee frost, and encapsulated in soluble coffee capsules, can be formulated to constitute an instant coffee product. Accordingly, the particulate preparation aroma composition may constitute up to 100% by weight of the coffee product composition. However, for most applications, it is suitable if the particulate aroma composition is present in an amount of from 0.05 to 50%, and preferably 0.1–10% by weight, of the coffee product composition.

The particulate soluble coffee product compositions in which the particulate preparation aroma composition of the present invention can be utilized can vary widely. Examples include instant coffee, including freeze dried and spray dried, and flavored and/or sweetened coffee beverage compositions such as for preparing instant cappuccino. Such compositions may include sweeteners, flavors, creamers, gasifying agents, fillers, bulking agents, buffers, colorants, etc. The aromatized particles can simply be mixed with the coffee composition and it is preferred to match the density of the aromatized particles to that of the particulate coffee composition in order to minimize segregation.

Beverages are prepared from the particulate coffee product composition by rehydrating at an appropriate coffee beverage preparation temperature. Hot coffee beverages are generally prepared at temperature of about 75–100° C. while cold coffee beverages are generally prepared at temperatures ranging from 0 to 25° C. Iced coffee beverages are often prepared by pouring a hot beverage solution over ice, in which case the initial burst of aroma is generated when the initial hot beverage solution is prepared. Desserts such as instant puddings and desserts are normally prepared with boiling or near boiling water.

EXAMPLE 1

This example demonstrates the ability to improve the appearance of an instant coffee beverage by replacement of coffee oil with a volatile flavor carrier according to this invention. Coffee oil has traditionally been used as an aroma carrier for instant coffee. However, like vegetable oils, this predominantly triglyceride oil is non-volatile and tends to float as small droplets that do not evaporate from the surface of a hot beverage. This does not normally pose a serious problem in instant coffee at the typically low use-levels needed to provide a package aroma. However, use of relatively high levels of aromatized coffee oil, typically needed to deliver a strong cup aroma, often produces an unsightly oil slick on the beverage. Replacement of aromatized coffee oil with aromatized d-limonene or other volatile carrier of this invention has been found to avoid this problem. These novel aromatized carriers similarly float as small droplets, but unlike coffee oil, they completely evaporate from the surface of the beverage without producing a residual oil slick.

Droplets of several liquids were provided on the surface of eight fluid ounces of water in a 400 mL beaker. Water temperature was maintained at 55, 65, 75, and 95° C. in four separate tests and effects were visually observed. Four different amounts (5, 10, 15 and 20 uL) of droplets of each liquid were applied at each test temperature. Droplets having a volume of about 5 uL to 10 uL (approximately 1–3 mm spheres) were produced by displacing four different amounts (5, 10, 15, and 20 uL) of each liquid from a 25 uL Hamilton Microliter fixed-needle syringe. Because a 10 uL displacement was needed to form a droplet that would fall from the syringe needle under its own weight, small volumes were delivered by touching the droplet that formed on the syringe needle to the surface of the water. Evaporation time for d-limonene was determined visually and was subject to variation since it is somewhat dependent on the method of addition, droplet size, presence of impurities, and the skill of the observer. Observed effects are reported in Table I and physical properties of the carriers are reported in Table II.

Table I summarizes the approximate visual rate of evaporation of the liquid droplets from the surface of hot water as a function of use-level and water temperature. It is evident

TABLE I

Approximate rate of evaporation from 8 ounces hot water

| Carrier | Volume | Evaporation Time (seconds) versus Water Temperature | | | |
|---|---|---|---|---|---|
| | | 55° C. | 65° C. | 75° C. | 95° C. |
| d-limonene | 5 μL | 160 | 80 | 35 | 25 |
| | 10 μL | 180 | 115 | 55 | 40 |
| | 15 μL | 200 | 130 | 65 | 50 |
| | 20 μL | 225 | 135 | 70 | 55 |
| coffee oil | 5–20 μL | Did not evaporate-produced unsightly oil slick. | | | |
| soybean oil | 5–20 μL | Did not evaporate-produced unsightly oil slick. | | | |
| 2-ethylfuran | 5–20 μL | Droplets rapidly evaporated from surface. | | | |
| ethyl acetate | 5–20 μL | Droplets rapidly evaporated from surface. | | | |
| triacetin | 5–20 μL | Droplets sank to bottom of beaker. | | | |
| benzyl alcohol | 5–20 μL | Droplets sank to bottom of beaker. | | | |
| ethanol | 5–20 μL | Droplets substantially dissolved in water. | | | |
| propylene glycol | 5–20 μL | Droplets substantially dissolved in water. | | | |

TABLE II

Comparison of Physical Properties of Carriers

| Traditional Flavor Carriers | Vapor Pressure* (mm Hg) | Boiling Point (° C.) | Density (g/cc) | Water Solubility | Suitable as Volatile Carrier | Freezing Point (° C.) |
|---|---|---|---|---|---|---|
| ethanol | 59 | 78 | 0.79 | miscible | no | −114 |
| isopropanol | ~45 | 82 | 0.78 | miscible | no | −89 |
| propylene glycol | 0.15 | 187 | 1.04 | miscible | no | −60 |
| triacetin | <0.01 | 259 | 1.16 | slight (7%) | no | 3 |
| benzyl alcohol | ~0.05 | 205 | 1.04 | slight (4%) | no | −15 |
| acetoin | ~5 | 148 | 1.00 | miscible | no | 15 |
| soybean oil | 0 | none | 0.92 | insoluble | no | −10 |
| triethyl citrate | <0.01 | 294 | 1.14 | insoluble | no | >10 |
| glycerol | <0.01 | 290 | 1.26 | miscible | no | 18 |
| water | 24 | 100 | 1.0 | miscible | no | 0 |
| Novel Volatile Carriers | | | | | | |
| d-limonene | 2.1 | 175 | 0.84 | insoluble | yes | −74 |
| 2-ethylfuran | ~50 | 92 | 0.91 | insoluble | yes | <−70 |
| ethyl acetate | 94 | 77 | 0.90 | slight (8%) | yes | −84 |

*Includes values reported in the literature and estimates based on available data. Vapor pressure, density, and water solubility (weight %) reported at 25° C.

that effective quantities of d-limonene will rapidly evaporate from hot coffee beverages and other food products normally reconstituted with near-boiling water. Alternative volatile carriers of this invention having lower boiling point than d-limonene, such as 2-ethylfuran and ethyl acetate, beneficially evaporate much faster from the surface of hot water. In contrast, triacetin and benzyl alcohol, traditional flavor carriers, quickly sank to the bottom of the beverage in this test. Although volatile, these carriers have density greater than water. Ethanol and glycerol, two other widely used traditional flavor carriers, were also found to be unsuitable since they substantially dissolved in the water. By comparison, it can be seen from Table I that the low-density, substantially water-insoluble, volatile carriers of this invention are superior to traditional flavor carriers for producing the rapid surface evaporation needed to provide a desirable burst of aroma from hot coffee beverages without producing a residual oil slick.

EXAMPLE 2

This example demonstrates the ability to further improve the performance of d-limonene as a volatile carrier in a hot coffee beverage application. This low-polarity monoterpene hydrocarbon has been found to possess the lowest odor impact among common terpenes. The product of commerce is sourced from citrus peel and contains a variety of more highly polar impurities including odiferous oxygenated terpenes and aliphatic compounds such as alcohols and aldehydes that give d-limonene a fruity odor. For instant coffee beverages, it is preferred to remove as much of these polar impurities as practically possible to minimize their potential impact on coffee beverage flavor and aroma. It was found that filtering commercial d-limonene through a column packed with silica gel, activated carbon, Florisil™, or mixtures of these adsorbents was effective in virtually eliminating impurities, confirmed by gas chromatography analysis and trained panel organoleptic evaluations. Addition of 10–20 μL of unpurified (97–99.7% purity) d-limonene obtained from several sources, including Citrus & Allied Essences LTD, Sigma-Aldrich Co., and Firmenich Inc., onto the surface of hot water produced perceptible orange-lemon-lime odor, slight beverage flavor, and no residual surface oil. After purification, the color of these d-limonene products was generally transformed from pale-yellow to clear-white, their odor impact was greatly reduced upon evaporation from hot water, and their flavor impact in water was reduced to below the threshold of perception.

EXAMPLE 3

This example demonstrates the ability to improve the performance of a volatile carrier in a hot coffee beverage application by choosing a carrier that has inherent odor particularly suited to the beverage. The very mild citrus aroma of purified d-limonene is particularly compatible with fruit-flavored beverages and the like, but somewhat less suitable for more subtly flavored beverages such as instant coffee. Furan and a variety of alkyl-substituted furans occur naturally in coffee and were found to have inherent odor better suited than d-limonene for use in instant coffee and related beverages. In particular, coffee flavors compounded into 2-methylfuran, 2-ethylfuran, 2,5-dimethylfuran, or mixtures were judged by trained panelists to produce aromas, when added to hot instant coffee beverages, that are better balanced than the same flavors compounded into d-limonene. These volatile carriers can be obtained from coffee only in very small quantities. Alternatively, they can be sourced from flavor houses and specialty chemical companies. The purification process described in Example 2 was found to significantly improve the quality and performance of these three liquids and their mixtures, sourced from Aldrich Chemical Flavors & Fragrances, when employed as aroma carriers. Filtration through adsorbents generally transformed their pale-yellow color to clear-white and greatly reduced residual odor and flavor attributed to impurities and oxidation products present in the starting materials. No residual surface oil was observed in these tests.

EXAMPLE 4

This example demonstrates the ability to compound flavors into the volatile carriers of this invention for use in delivering an aroma. In order to demonstrate the utility of these novel carriers, a multi-component model flavor was compounded into a variety of carrier liquids to permit quantitative analysis of aroma release. A diverse mixture of six components was utilized in the model flavor in order to span a wide range of boiling point, water solubility, density, and chemical functionality. The model flavor was compounded into a number of traditional and novel carrier liquids having a wide range of properties. Two traditional carriers, soybean oil and ethanol, having very different physical properties were chosen along with three novel carriers of this invention, d-limonene, 2-ethylfuran, and ethyl acetate. Soybean oil was used as a reference carrier to depict the general performance of non-volatile triglyceride oils such as coffee oil. Each flavor component was present at a level of 5% wt/wt in the carrier, for a total flavor concentration of 30% wt/wt flavor in all carriers. Aroma release was quantified by injecting the aromatized carriers into an empty 50 mL dry jar preheated to 85° C. and, in another experiment, into a 250 mL jar containing 200 mL water preheated to 85° C. In each case, the internal headspace of the jar was rapidly swept with nitrogen gas and analyzed using a GC/MS (gas chromatography/mass spectroscopy) technique to measure the amount of each flavor that evaporated over time to produce aroma.

Tables III and IV detail the composition and physical-chemical properties of the model flavor components and carriers studied.

TABLE III

Physical-Chemical Properties of Model Flavor Components

| Flavor Component | Chemical Classification | Chemical Formula | Boiling Point (° C.) | Density | Water Solubility | Freezing Point (° C.) |
|---|---|---|---|---|---|---|
| 2-methylpropanal | aldehyde | $C_4H_8O$ | 64 | 0.79 | low (10%) | −66 |
| diacetyl | ketone | $C_4H_6O_2$ | 88 | 0.99 | moderate (20%) | −2 |
| 2-ethylfuran | heterocyclic | $C_6H_8O$ | 92 | 0.91 | insoluble | |
| isobutyl acetate | ester | $C_6H_{12}O_2$ | 118 | 0.87 | very low (0.5%) | −99 |
| 4-ethylguaiacol | aromatic alcohol | $C_9H_{12}O_2$ | 235 | 1.06 | very low | 15 |
| eugenol | oxygenated monoterpene | $C_{10}H_{12}O_2$ | 255 | 1.07 | insoluble | −9 |

All components are present in coffee aroma.
Solubility data are approximate.

TABLE IV

Physical-Chemical Properties of Carriers

| Carrier | Chemical Classification | Chemical Formula | Boiling Point (° C.) | Density | Water Solubility | Freezing Point (° C.) |
|---|---|---|---|---|---|---|
| ethanol | alcohol | $C_2H_6O$ | 78 | 0.79 | miscible | −114 |
| ethyl acetate | ester | $C_4H_8O_2$ | 77 | 0.90 | low (10%) | −83 |
| 2-ethylfuran | heterocyclic | $C_6H_8O$ | 92 | 0.91 | insoluble | |
| d-limonene | monoterpene hydrocarbon | $C_{10}H_{16}$ | 175 | 0.84 | insoluble | −74 |
| soybean oil | triglyceride | N/A | N/A | 0.92 | insoluble | −10 |

Soybean oil is Wesson brand soybean oil.

Table V summarizes the total recovery of flavor as aroma released from each carrier in both dry and wet systems.

TABLE V

Total Model Aroma Recovery from Heated Jar Experiments

Percent of Model
Flavor Evaporated as Aroma during 2-Minutes after Addition to Jar

| Test Type | soybean oil | ethanol | 2-ethylfuran | d-limonene | ethyl acetate |
|---|---|---|---|---|---|
| Dry Jar | 62% | 72% | 81% | 78% | 48% |
| Wet Jar | 40% | 23% | 41% | 33% | 29% |

All data are averages of two duplicate analyses.
Total does not include response for 2-ethylfuran.

It can be seen that significantly less aroma was released from carriers, especially from water-miscible ethanol, in contact with hot water than from carriers injected into the hot dry jar. This may be attributable to fractional partitioning or dissolution of the flavor in water. Surface oil was observed with the soybean oil sample but not with the other samples.

Table VI compares the release rate of two aroma components that significantly contribute to perceived coffee freshness, 2-methylpropanal and diacetyl, from all carriers when injected into the heated dry jar.

TABLE VI

Selected Model Component Aroma Release Rate from Hot Dry Jar

| Time Segment | GC Headspace Counts (1x10E6) versus Flavor Carrier | | | | |
|---|---|---|---|---|---|
| 2-methylpropanal | soybean oil | ethanol | 2-ethylfuran | d-limonene | ethyl acetate |
| 0–10 sec | 256 | 262 | 430 | 432 | 408 |
| 10–20 sec | 297 | 418 | 405 | 368 | 403 |
| 20–30 sec | 209 | 350 | 203 | 205 | 202 |
| 0–30 sec | 762 | 1,030 | 1,038 | 1,005 | 1,012 |
| 30–60 sec | 262 | 231 | 252 | 183 | 149 |
| 60–90 sec | 111 | 54 | 31 | 35 | 24 |
| 90–120 sec | 53 | 20 | 14 | 21 | 13 |
| 0–120 sec | 1,188 | 1,335 | 1,335 | 1,244 | 1,198 |
| diacetyl | soybean oil | ethanol | 2-ethylfuran | d-limonene | ethyl acetate |
| 0–10 sec | 201 | 210 | 309 | 277 | 497 |
| 10–20 sec | 223 | 256 | 315 | 259 | 498 |
| 20–30 sec | 183 | 239 | 179 | 178 | 237 |
| 0–30 sec | 607 | 705 | 803 | 714 | 1,232 |
| 30–60 sec | 210 | 191 | 199 | 173 | 178 |
| 60–90 sec | 129 | 69 | 42 | 60 | 38 |
| 90–120 sec | 72 | 28 | 22 | 37 | 11 |
| 0–120 sec | 1,018 | 993 | 1,066 | 984 | 1,459 |

All data are averages of two duplicate analyses.

It can be seen that, in general, the volatile carriers, d-limonene, 2-ethylfuran, and ethyl acetate produced a greater initial aroma burst than the soybean oil and ethanol references. Their peak evaporation rates occurred instantaneously for 2-methylpropanal, from 0–10 seconds, with strong continued release through the 10–20 second time segment. Conversely, peak evaporation rates of the reference carriers were somewhat delayed, occurring during the 10–20 second time segment. For diacetyl, the volatile carriers produced more rapid and sustained evaporation during the 0–20 second time segment, and d-limonene produced more rapid peak evaporation from 0–10 seconds. No residual surface oil was observed, except in the aromatized soybean oil samples.

EXAMPLE 5

This example discloses a method to aromatize and encapsulate volatile carriers into a particulate form that can be used to enhance aroma release from an instant coffee beverage upon reconstitution in hot water. Instant Maxwell House® Coffee was reconstituted in water to produce a 50% wt/wt solution. For each model coffee flavor system described in Example 4, 7.0 g of aromatized carrier was combined with 42.0 g of coffee solution and encapsulated using the following process. The coffee solution was cooled to 5° C. and aerated by mixing at 10,000 rpm for one minute using a Fisher Scientific PowerGen 700D immersion mixer. The aromatized carrier was then added and mixed at 10,000 rpm for one minute, sufficient to emulsify those aromatized carriers that are immiscible in water. The aromatized coffee solution was added drop-wise from a syringe fitted with a 24-gauge needle into liquid nitrogen to form small frozen particles. These particles were separated from the liquid nitrogen and added to an excess quantity of finely milled instant coffee powder. Upon warming and slow desiccation in this powder over two days, the frozen particles were transformed into dry solid coffee capsules containing the aromatized carrier within a hard glassy shell. Aeration of the cold coffee solution prior to addition to liquid nitrogen was conducted to produce capsules having density less than 1.0 g/cc that float to maximize aroma release when added to hot water. Mixing and aeration can be conducted in an inert atmosphere to minimize oxidation of sensitive flavors.

Approximately 0.1 g quantities of capsules, sized between 10–12 mesh sieves, were added to eight ounces of 85° C. water in a sealed jar and the headspace analyzed using the method described in Example 4. Sieve size here, and elsewhere in the examples, is U.S. standard sieve size unless otherwise indicated. Particle size was 1.7–2 mm. All experiments were conducted in duplicate and the data averaged and normalized to exactly 0.1 g capsule weight.

Tables VII–IX summarize the aroma release rate of each model system component from the coffee capsules during the first three 10-second periods. Because the capsules do not dissolve instantaneously upon contact with hot water, it is to be expected that proportionately less evaporation occurs during the first 10-second period and that the greatest relative error in aroma analysis occurs during this time period.

TABLE VII

Aroma Release from Capsules in Heated Water - 0–10 Seconds

| Flavor Component | GC Headspace Counts (1x10E6) versus Flavor Carrier | | | | |
| --- | --- | --- | --- | --- | --- |
|  | soybean oil | ethanol | 2-ethylfuran | d-limonene | ethyl acetate |
| 2-methylpropanal | 5.6 | 7.8 | 61.3 | 15.8 | 27.5 |
| diacetyl | 3.0 | 1.3 | 18.5 | 5.1 | 20.2 |
| 2-ethylfuran | 10.1 | 26.5 | — | 38.0 | 59.6 |
| isobutyl acetate | 7.9 | 33.7 | 119 | 27.9 | 63.3 |
| 4-ethylguaiacol | 2.3 | 9.6 | 16.9 | 4.2 | 6.0 |
| eugenol | 2.4 | 8.4 | 24.4 | 3.8 | 4.0 |
| Total | 21.2 | 60.8 | 240.1 | 56.8 | 121.0 |
| versus oil | 1.00x | 2.87x | 11.33x | 2.68x | 5.72x |

All data are averages of two duplicate analyses.
Total does not include response for 2-ethylfuran.

TABLE VIII

Aroma Release from Capsules in Heated Water - 10–20 Seconds

| Flavor Component | GC Headspace Counts (1x10E6) versus Flavor Carrier | | | | |
| --- | --- | --- | --- | --- | --- |
|  | soybean oil | ethanol | 2-ethylfuran | d-limonene | ethyl acetate |
| 2-methylpropanal | 52.4 | 33.8 | 185 | 149 | 152 |
| diacetyl | 18.5 | 6.2 | 81.0 | 46.6 | 89.8 |
| 2-ethylfuran | 153 | 127 | — | 377 | 332 |
| isobutyl acetate | 114 | 163 | 464 | 377 | 411 |
| 4-ethylguaiacol | 4.8 | 9.4 | 36.2 | 20.9 | 23.7 |
| eugenol | 3.2 | 8.3 | 18.7 | 18.4 | 18.0 |
| Total | 192.9 | 220.7 | 784.9 | 611.9 | 694.5 |
| versus oil | 1.00x | 1.14x | 4.07x | 3.17x | 3.60x |

All data are averages of two duplicate analyses.
Total does not include response for 2-ethylfuran.

TABLE IX

Aroma Release from Capsules in Heated Water - 20–30 Seconds

| Flavor Component | GC Headspace Counts (1x10E6) versus Flavor Carrier | | | | |
| --- | --- | --- | --- | --- | --- |
|  | soybean oil | ethanol | 2-ethylfuran | d-limonene | ethyl acetate |
| 2-methylpropanal | 126 | 76.8 | 158 | 247 | 131 |
| diacetyl | 46.3 | 18.4 | 88.7 | 77.7 | 84.3 |
| 2-ethylfuran | 358 | 231 | — | 582 | 319 |
| isobutyl acetate | 337 | 317 | 695 | 666 | 417 |
| 4-ethylguaiacol | 56.6 | 21.7 | 64.0 | 38.1 | 23.3 |
| eugenol | 9.7 | 24.9 | 74.0 | 30.1 | 16.8 |
| Total | 575.6 | 458.8 | 1,079.7 | 1,058.9 | 672.4 |
| versus oil | 1.00x | (0.80x) | 1.88x | 1.84x | 1.17x |

All data are averages of two duplicate analyses.
Total does not include response for 2-ethylfuran.

Tables X–XIII summarize the aroma release rate of each model system component from the coffee capsules during the four 30-second increments of the analysis.

TABLE X

Aroma Release from Capsules in Heated Water - 0–30 Seconds

| Flavor Component | GC Headspace Counts (1x10E6) versus Flavor Carrier | | | | |
|---|---|---|---|---|---|
| | soybean oil | ethanol | 2-ethylfuran | d-limonene | ethyl acetate |
| 2-methylpropanal | 184.0 | 118.4 | 404.3 | 411.8 | 310.5 |
| diacetyl | 67.8 | 25.9 | 188.2 | 129.4 | 194.3 |
| 2-ethylfuran | 521.1 | 384.5 | — | 997.0 | 710.6 |
| isobutyl acetate | 458.9 | 513.7 | 1,278 | 1,070.9 | 891.3 |
| 4-ethylguaiacol | 63.7 | 40.7 | 117.1 | 63.2 | 53.0 |
| eugenol | 15.3 | 41.6 | 117.1 | 52.3 | 38.8 |
| Total | 789.7 | 740.3 | 2,104.7 | 1,727.6 | 1,487.9 |
| versus oil | 1.00x | (0.94x) | 2.67x | 2.19x | 1.88x |

All data are averages of two duplicate analyses.
Total does not include response for 2-ethylfuran.

TABLE XI

Aroma Release from Capsules in Heated Water - 30–60 Seconds

| Flavor Component | GC Headspace Counts (1x10E6) versus Flavor Carrier | | | | |
|---|---|---|---|---|---|
| | soybean oil | ethanol | 2-ethylfuran | d-limonene | ethyl acetate |
| 2-methylpropanal | 312 | 160 | 254 | 485 | 165 |
| diacetyl | 119 | 53.4 | 158 | 135 | 143 |
| 2-ethylfuran | 853 | 441 | — | 1,017 | 502 |
| isobutyl acetate | 993 | 641 | 916 | 1,379 | 673 |
| 4-ethylguaiacol | 91.6 | 71.2 | 145 | 1,030 | 66.4 |
| eugenol | 59.8 | 80.8 | 190 | 117 | 62.3 |
| Total | 1,575.4 | 1,006.4 | 1,663.0 | 2,219 | 1,109.7 |
| versus oil | — | (0.64x) | 1.06x | 1.41x | (0.70x) |

All data are averages of two duplicate analyses.
Total does not include response for 2-ethylfuran.

TABLE XII

Aroma Release from Capsules in Heated Water - 60–90 Seconds

| Flavor Component | GC Headspace Counts (1x10E6) Collected versus 60–90 Flavor Carrier | | | | |
|---|---|---|---|---|---|
| | soybean oil | ethanol | 2-ethylfuran | d-limonene | ethyl acetate |
| 2-methylpropanal | 151 | 56.8 | 47.4 | 100 | 45.6 |
| diacetyl | 82.1 | 30.0 | 45.8 | 57.6 | 54.1 |
| 2-ethylfuran | 539 | 199 | — | 331 | 276 |
| isobutyl acetate | 610 | 264 | 188 | 436 | 357 |
| 4-ethylguaiacol | 88.9 | 58.5 | 109 | 113 | 77.7 |
| eugenol | 62.8 | 54.4 | 128 | 123 | 66.0 |
| Total | 994.8 | 463.7 | 518.2 | 829.6 | 600.4 |
| versus oil | — | (0.47x) | (0.52x) | (0.83x) | (0.60x) |

All data are averages of two duplicate analyses.
Total does not include response for 2-ethylfuran.

TABLE XIII

Aroma Release from Capsules in Heated Water - 90–120 Seconds

| Flavor Component | GC Headspace Counts (1x10E6) versus Flavor Carrier | | | | |
|---|---|---|---|---|---|
| | soybean oil | ethanol | 2-ethylfuran | d-limonene | ethyl acetate |
| 2-methylpropanal | 105 | 23.6 | 19.2 | 41.7 | 23.5 |
| diacetyl | 78.1 | 20.3 | 28.8 | 35.6 | 34.7 |
| 2-ethylfuran | 378 | 71.8 | — | 107 | 135 |
| isobutyl acetate | 382 | 97.2 | 75.2 | 162 | 145 |
| 4-ethylguaiacol | 102 | 74.4 | 88.2 | 102 | 54.8 |
| eugenol | 73.9 | 57.1 | 104 | 77.0 | 40.4 |
| Total | 741.0 | 272.6 | 315.4 | 418.3 | 298.4 |
| versus oil | 1.00x | (0.37x) | (0.43x) | (0.56x) | (0.40x) |

All data are averages of two duplicate analyses.
Total does not include response for 2-ethylfuran.

Table XIV summarizes aroma release for each component during the full two-minute analysis while Table XV summarizes cumulative release during each time segment analyzed.

TABLE XIV

Cumulative Aroma Release from Capsules in Heated Water - 0–120 Seconds

| Flavor Component | Cumulative GC Headspace Counts (1x10E6) versus Flavor Carrier | | | | |
|---|---|---|---|---|---|
| | soybean oil | ethanol | 2-ethylfuran | d-limonene | ethyl acetate |
| 2-methylpropanal | 752.0 | 358.8 | 724.9 | 1,038.5 | 544.6 |
| diacetyl | 347.0 | 129.6 | 420.8 | 357.6 | 426.1 |
| 2-ethylfuran | 2,291.1 | 1,096.3 | — | 2,452.0 | 1,623.6 |
| isobutyl acetate | 2,443.9 | 1,515.9 | 2,457.2 | 3,047.9 | 2066.3 |
| 4-ethylguaiacol | 346.2 | 244.8 | 459.3 | 381.2 | 251.9 |
| eugenol | 211.8 | 233.9 | 539.1 | 369.3 | 207.5 |
| Total | 4,100.9 | 2,483.0 | 4,601.3 | 5,194.5 | 3,496.4 |
| versus oil | 1.00x | (0.61x) | 1.12x | 1.27X | (0.85x) |

All data are averages of two duplicate analyses.
Total does not include response for 2-ethylfuran.

TABLE XV

Total Aroma Release from Capsules in Heated Water versus Time

| Time Segment | Total GC Headspace Counts (1x10E6) versus Flavor Carrier | | | | |
|---|---|---|---|---|---|
| | soybean oil | ethanol | 2-ethylfuran | d-limonene | ethyl acetate |
| 0–10 sec | 21.2 | 60.8 | 240.1 | 56.8 | 121.0 |
| 10–20 sec | 192.9 | 220.7 | 784.9 | 611.9 | 742.7 |
| 20–30 sec | 575.6 | 458.8 | 1,079.7 | 1,058.9 | 721.3 |
| 0–30 sec | 789.7 | 740.3 | 2,104.7 | 1,727.6 | 1,585.0 |
| 30–60 sec | 1,575.4 | 1,006.4 | 1,663.0 | 2,219.0 | 1,187.4 |
| 60–90 sec | 994.8 | 463.7 | 518.2 | 829.6 | 642.7 |
| 90–120 sec | 741.0 | 272.6 | 315.4 | 418.3 | 320.4 |
| 0–120 sec | 4,100.9 | 2,483.0 | 4,601.3 | 5,194.5 | 3,735.5 |
| versus oil | 1.00x | (0.61x) | 1.12x | 1.27x | (0.91x) |

All data are averages of two duplicate analyses.
Total does not include response for 2-ethylfuran.

Table XVI summarizes aroma release normalized against the release from the soybean oil reference.

TABLE XVI

Normalized Aroma Release from Capsules in Heated Water versus Time

Normalized Total GC Headspace Counts (1x10E6) versus Flavor Carrier

| Time Segment | soybean oil | ethanol | 2-ethylfuran | d-limonene | ethyl acetate |
|---|---|---|---|---|---|
| 0–10 sec | 1.00x | 2.87x | 11.33x | 2.68x | 5.72x |
| 10–20 sec | 1.00x | 1.14x | 4.07x | 3.17x | 3.60x |
| 20–30 sec | 1.00x | (0.80x) | 1.88x | 1.84x | 1.17x |
| 0–30 sec | 1.00x | (0.94x) | 2.67x | 2.19x | 1.88x |
| 30–60 sec | 1.00x | (0.64x) | 1.06x | 1.41x | (0.70x) |
| 60–90 sec | 1.00x | (0.47x) | (0.52x) | (0.83x) | (0.60x) |
| 90–120 sec | 1.00x | (0.37x) | (0.43x) | (0.56x) | (0.40x) |
| 0–120 sec | 1.00x | (0.61x) | 1.12x | 1.27x | (0.85x) |

All data are averages of two duplicate analyses.
Total does not include response for 2-ethylfuran.

TABLE XVII

Physical Properties of Particles

| Aromatizing Composition | | | | Particulate | | |
|---|---|---|---|---|---|---|
| Flavor | Carrier | % Flavor | % Carrier | Density (g/cc) | Size (mm) | Bulk Density (g/cc) | Absolute Density (g/cc) |
| model coffee | soybean oil | 30 | 70 | 0.93 | 1.7–2.0 | 0.54 | 0.62 |
| model coffee | ethanol | 30 | 70 | 0.84 | 1.7–2.0 | 0.58 | 0.89 |
| model coffee | 2-ethylfuran | 30 | 70 | 0.92 | 1.7–2.0 | 0.53 | 0.67 |
| model coffee | d-limonene | 30 | 70 | 0.87 | 1.7–2.0 | 0.48 | 0.66 |
| model coffee | ethyl acetate | 30 | 70 | 0.91 | 1.7–2.0 | 0.54 | 0.68 |

It can be seen that the preferred water-insoluble volatile carriers of this invention performed significantly better than the soybean oil reference on all measures. Ethanol performed relatively poorly, attributable to miscibility of this carrier with water. Ethyl acetate performance was intermediate, with strong initial aroma release being somewhat compromised by less total aroma release due to the slight solubility of this carrier in water. Most importantly, the volatile carriers of this invention released significantly more aroma in the critical first 30 seconds than the soybean oil reference without producing residual surface oil.

EXAMPLE 6

This example demonstrates enhanced release of a complex artificial coffee aroma when compounded into a novel volatile carrier and encapsulated according to the method of Example 5. An artificial coffee flavor containing over 20 components was compounded by an experienced flavorist into several different carrier liquids. The concentration of flavor in each carrier was constant at approximately 30% wt/wt. A mixture of two traditional carriers, propylene glycol and ethanol, was compared to two different novel volatile carriers of this invention, d-limonene and 2-ethylfuran. Each system was encapsulated in the coffee matrix according to the method described in Example 5. The capsules were similarly sized and equal amounts added to hot water. An experienced panel concluded that capsules containing flavor compounded into 2-ethylfuran produced the strongest aroma burst, followed by capsules containing flavor compounded into d-limonene. No surface oil was observed with either of these capsules. Capsules containing flavor compounded into the mixture of propylene glycol and ethanol did not provide a strong aroma burst.

EXAMPLE 7

This example demonstrates the utility and versatility of this invention in producing encapsulated flavors with enhanced aroma release properties for use in particulate specialty soluble coffee beverage products. The artificial coffee aroma described in Example 6 was individually compounded by experienced flavorists into d-limonene and 2-ethylfuran and encapsulated in a coffee matrix according to the method described in Example 5. Freeze-dried Kenco™ Really Rich coffee was reconstituted with water to make a 50% wt/wt coffee solution and the soluble coffee capsules were dried in a finely milled powder of the same coffee. The capsules were sized into several different ranges: 4–6 mesh; 6–8 mesh; 8–10 mesh; and 10–14 mesh. Performance was evaluated by combining 0.15 g capsules with 20 g Maxwell House Cappuccino powder and reconstituting in 8 oz. near-boiling water. The capsules dissolved and delivered a strong aroma burst. The smaller capsules dissolved more rapidly than larger capsules to provide faster aroma release. An experienced panel concluded that, in general, the capsules containing flavors compounded into 2-ethylfuran produced a stronger aroma burst than capsules containing flavors compounded into d-limonene. Dissolution of the floating coffee capsules produced a desirable marbleized foam color. No residual surface oil was observed in these tests.

EXAMPLE 8

This example demonstrates the ability to encapsulate flavors in a white capsule matrix that does not produce brown color spots or streaks in a cappuccino foam. A mixture of 25.2 g 24DE corn syrup solids and 2.0 g VersaWhip 600K hydrolyzed soy protein (Quest International) was dissolved in 14.8 g water. The artificial coffee aroma described in Example 6 was compounded into d-limonene and 2-ethylfuran. Seven grams of the aromatized carriers were emulsified into the 42.0 g solutions, then dropped into liquid nitrogen to form frozen particles. The particles were then separated from the liquid nitrogen and dried in an excess amount of powdered 10DE corn maltodextrin for 48 hours. Bulk density of the particles was about 0.3 g/cc. When sized and evaluated in Maxwell House Café Cappuccino® according to the method of Example 7, the capsules dissolved and delivered a strong aroma burst without discoloring the predominantly white foam and without leaving surface oil. An experienced panel concluded that, in general, the capsules containing flavors compounded into 2-ethylfuran produced a stronger aroma burst than capsules containing flavors compounded into d-limonene. Similar capsules made without hydrolyzed soy protein had a bulk density of about 0.55 g/cc, were not sufficiently soluble, and did not rupture quickly when added to hot water. It was found that hydrolyzed milk protein or gelatin could similarly be used in place of the hydrolyzed soy protein to allow greater incorporation of gas in the solution during mixing, resulting in lower capsule density and an increased rate of dissolution. It was also found that optional use of surface-active agents such as polysorbate 60/80 could be used to further speed capsule dissolution.

EXAMPLE 9

This example demonstrates the advantage of using volatile carriers of this invention to prepare a genuine coffee aroma when a coffee frost is used as the aroma source. Coffee oil is typically aromatized by direct contact with a condensed frost while heating to prevent the oil from freezing. Unfortunately, heating causes a substantial evaporative loss of aroma, particularly of desirable highly volatile and labile components that contribute disproportionately to coffee freshness and quality. It was found that because the novel volatile carriers of this invention typically have freezing points much lower than triglyceride oils, they can be aromatized by direct contact with coffee frosts without the need for heating. This was successfully demonstrated for two novel carriers, d-limonene and 2-ethylfuran. The carriers were first purified using the method described in Example 2 and then utilized to prepare four different aromatized carriers using the following procedure.

Two different characteristically yellow frosts were obtained from grinding or steaming roasted coffee and condensing the volatiles at a temperature below the freezing point of carbon dioxide, the principal component of coffee frosts. Each of the purified colorless carriers was chilled to about 5° C. and individually directly contacted with the two different frosts for a period of time sufficient for the frosts to melt and for the coffee aroma components to reach equilibrium with the carriers. The carriers did not freeze upon contact with the frosts and possessed adequate solvation capacity to become highly aromatized with coffee components, evidenced by their acquired yellow colors. In fact, this method produced completely volatile, genuine aroma systems having significantly higher coffee aroma concentration and odor impact than coffee oil aromatized using traditional means. Their high aroma contents were confirmed using GC analysis and organoleptic evaluation. The aromatized carriers were encapsulated in a coffee matrix according to the procedure described in Example 5. When sized and mixed with instant coffee and reconstituted in hot water, the capsules produced a strong burst of high-quality, fresh coffee aroma that could not be achieved by similar encapsulation of an equal amount of conventionally aromatized coffee oil. No residual surface oil was observed.

EXAMPLE 10

This example demonstrates the utility of this invention in producing encapsulated flavors with enhanced aroma release properties for use in roast and ground coffee preparation applications. One gram of the coffee capsules described in Example 9 containing 2-ethylfuran aromatized with roasted coffee bean grinder gas frost was mixed with 50 g Blå mocca Mellanrost Brygg™ roast and ground coffee. The mixture was placed in the filter basket of a Morphy Richards™ 12-cup coffee maker and brewed with one liter of water. The capsules dissolved in the filter basket upon contact with the percolating hot water and delivered an intense fresh coffee aroma burst of very good quality. An experienced panel judged the intensity and quality of this preparation aroma superior to the preparation aroma obtained from a similar 50 g/L preparation of the same coffee without capsule addition.

What is claimed is:

1. A coffee aroma composition comprising a coffee aroma constituent and a volatile organic carrier constituent, said volatile organic carrier constituent being in the liquid state at 25° C. and atmospheric pressure, and having a vapor pressure of at least 0.01 mm Hg at 25° C., a boiling point in the range of 25 to 250° C., a density of less than 1.0 g/cc at 25° C., and water solubility of not more than about 10% by weight at 25° C.; and said carrier constituent being present in an amount of at least 25% by weight based on the total weight of the aroma constituent and the carrier constituent.

2. A coffee aroma composition according to claim 1 wherein said carrier constituent is present in an amount of at least 35% by weight based on the total weight of the aroma constituent and the carrier constituent.

3. A coffee aroma composition according to claim 1 wherein said carrier constituent is present in an amount of at least 50% by weight based on the total weight of the aroma constituent and the carrier constituent.

4. A coffee aroma composition according to claim 1 wherein said carrier constituent has a vapor pressure of at least 0.5 mm Hg at 25° C., a boiling point in the range of 25–200° C., and water solubility of not more than about 5% by weight at 25° C.

5. A coffee aroma composition according to claim 1 wherein said carrier constituent has a vapor pressure of at least 2.0 mm Hg at 25° C., a boiling point in the range of 25–100° C., and a density in the range of 0.7 to 0.99 g/cc at 25° C., and is water insoluble.

6. A coffee aroma composition according to claim 5 wherein said carrier constituent has a vapor pressure of at least 5.0 mm at 25° C. and a density in the range of 0.8 to 0.95 g/cc at 25° C.

7. A coffee aroma composition according to claim 1 wherein said carrier constituent is present in said composition in an amount of more than 50% by weight based on the total weight of said carrier constituent and the coffee aroma constituent.

8. A coffee aroma composition according to claim 1, wherein said carrier comprises at least one member selected from the group consisting of monoterpene hydrocarbons, esters, and alkyl furans.

9. A coffee aroma composition according to claim 1, wherein said volatile carrier comprises at least one member selected from the group consisting of d-limonene, 2-ethylfuran, 2-methylfuran, 2,5-dimethylfuran, and ethyl acetate.

10. A coffee aroma composition according to claim 1, wherein said carrier constituent comprises a plurality of volatileorganic compounds, and wherein said carrier compounds are miscible with one another.

11. A coffee aroma composition according to claim 10 wherein said plurality of carrier compounds belong to a common chemical classification group.

12. A particulate coffee beverage preparation aroma composition comprising particles having a solid water soluble matrix, said matrix having physically entrapped therein a coffee aroma composition, said coffee aroma composition comprising a coffee aroma constituent and a volatile organic carrier constituent, said volatile organic carrier constituent being in the liquid state at 25° C. and atmospheric pressure, and having a vapor pressure of at least 0.01 mm Hg at 25° C., a boiling point in the range of 25 to 250° C., a density of less than 1.0 g/cc at 25° C., and water solubility of not more than about 10% by weight at 25° C.; and said carrier constituent being present in an amount of at least 25% by weight based on the total weight of the aroma constituent and the carrier constituent.

13. A particulate coffee beverage preparation aroma composition according to claim 12, wherein said particles have a particle size of from 0.1 to 10 mm and an absolute density of 0.2 to 0.99 g/cc at 25° C.

14. A particulate coffee beverage preparation aroma composition according to claim 12, wherein said particles have a particle size of 0.5 to 5 mm and an absolute density of 0.3–0.95 g/cc at 25° C.

15. A particulate coffee beverage preparation aroma composition according to claim 12, wherein said particles have a particle size of from 1–3 mm and an absolute density of 0.4–0.9 g/cc at 25° C.

16. A particulate coffee beverage preparation aroma composition according to claim 12, wherein said water soluble matrix is coffee-derived.

17. A particulate coffee beverage preparation aroma composition according to claim 12, wherein said matrix comprises soluble coffee.

18. A particulate coffee beverage preparation aroma composition according to claim 16, wherein the amount of said matrix is up to 99% by weight based on the weight of said particles.

19. A particulate coffee beverage preparation aroma composition according to claim 12, wherein said coffee aroma composition is present in an amount of from 1–95% by weight based on the weight of said particulate coffee beverage preparation aroma composition.

20. A particulate coffee beverage preparation aroma composition according to claim 12, wherein said coffee aroma composition is present in an amount of from 10–80% by weight based on the weight of said particulate coffee beverage preparation aroma composition.

21. A particulate coffee beverage preparation aroma composition according to claim 12, wherein said carrier constituent is present in an amount of at least 35% by weight based on the total weight of the aroma constituent and the carrier constituent.

22. A particulate coffee beverage preparation aroma composition according to claim 12 wherein said carrier constituent is present in an amount of at least 50% by weight based on the total weight of the aroma constituent and the carrier constituent.

23. A particulate coffee beverage preparation aroma composition according to claim 12 wherein said carrier constituent has a vapor pressure of at least 0.5 mm Hg at 25° C., a boiling point in the range of 25–200° C., and water solubility of not more than about 5% by weight at 25° C.

24. A particulate coffee beverage preparation aroma composition according to claim 12, wherein said carrier constituent has a vapor pressure of at least 2.0 mm Hg at 25° C., a boiling point in the range of 25–100° C., and a density in the range of 0.7 to 0.99 g/cc at 25° C., and is water insoluble.

25. A particulate coffee beverage preparation aroma composition according to claim 24, wherein said carrier constituent has a vapor pressure of at least 5.0 mm at 25° C., and a density in the range of 0.8 to 0.95 g/cc at 25°.

26. A Particulate coffee beverage preparation aroma composition according to claim 12, wherein said aroma constituent is present in said composition in an amount of 0.1 to 100% by weight based on the weight of the said carrier constituent.

27. A particulate coffee beverage preparation aroma composition according to claim 12, wherein said carrier comprises at least one member selected from the group consisting of monoterpene hydrocarbons, esters, and alkyl furans.

28. A particulate coffee beverage preparation aroma composition according to claim wherein said volatile carrier comprises at least one member selected from the group consisting of d-limonene, 2-ethylfuran, 2-methylfuran, 2,5-dimethylfuran, and ethyl acetate.

29. A particulate coffee beverage preparation aroma composition according to claim 12, wherein said carrier constituent comprises a plurality of volatile organic compounds, and wherein said carrier compounds are miscible with one another.

30. A coffee aroma composition according to claim 29 wherein said plurality of carrier compounds belong to a common chemical classification group.

31. In a particulate soluble coffee product composition containing a particulate coffee beverage preparation aroma composition, the improvement wherein said particulate coffee beverage preparation aroma composition comprises particles having a solid water soluble matrix, said matrix having physically entrapped therein a coffee aroma composition, said coffee aroma composition comprising a coffee aroma constituent and a volatile organic carrier constituent, said volatile organic carrier constituent being in the liquid state at 25° C. and atmospheric pressure, and having a vapor pressure of at least 0.01 mm Hg at 25° C., a boiling point in the range of 25 to 250° C., a density of less than 1.0 g/cc at 25° C., and water solubility of not more than about 10% by weight at 25° C.; and said carrier constituent being present in an amount of at least 25% by weight based on the total weight of said aroma constituent and said carrier constituent.

32. A particulate soluble coffee product composition according to claim 31 further including at least one additional ingredient selected from the group consisting of sweeteners, creamers, fillers, bulking agents, gasifying agents, flavors, colorants, and buffers.

33. A particulate soluble coffee product composition according to claim 31, wherein said particulate preparation aroma composition is present in an amount of from 0.05 to 50% by weight based on the weight of the coffee product composition.

34. A particulate soluble coffee product composition according to claim 31, wherein said particulate preparation aroma composition is present in an amount of from 0.1 to 10% by weight based on the weight of the coffee product composition.

35. A particulate soluble coffee product composition according to claim 31, wherein said particles have a particle size of from 0.1 to 10 mm and an absolute density of 0.2 to 0.99 g/cc at 25° C.

36. A particulate soluble coffee product composition according to claim 31, wherein said particles have a particle size of from 0.5 to 5 mm and an absolute density of 0.3 to 0.95 g/cc at 25° C.

37. A particulate soluble coffee product composition according to claim 31, wherein said particles have a particle size of from 1–3 mm and an absolute density of 0.4–0.9 g/cc at 25° C.

38. A particulate soluble coffee product composition according to claim 31, wherein said water soluble matrix is coffee-derived.

39. A particulate soluble coffee product composition according to claim 38, wherein said matrix comprises soluble coffee.

40. A particulate soluble coffee product composition according to claim 38, in the amount of said matrix is up to 99% by weight based on the weight of said particles.

41. A particulate soluble coffee product composition according to claim 31, wherein said coffee aroma composition is present in an amount of from 1–95% by weight based on the weight of said particulate coffee beverage preparation aroma composition.

42. A particulate soluble coffee product composition according to claim 31, wherein said coffee aroma composition is present in an amount of from 10–80% by weight based on the weight of said particulate coffee beverage preparation aroma composition.

43. A particulate soluble coffee product composition according to claim 31 wherein said carrier constituent is present in an amount of at least 35% by weight based on the total weight of said aroma constituent and said carrier constituent.

44. A particulate soluble coffee product composition according to claim 31 wherein said carrier constituent is present in an amount of at least 50% by weight based on the total weight of said aroma constituent and said carrier constituent.

45. A particulate soluble coffee product composition according to claim 31, wherein said carrier constituent has a vapor pressure of at least 0.5 mm Hg at 25° C., a boiling point in the range of 25–200° C., and water solubility of not more than about 5% by weight at 25° C.

46. A particulate soluble coffee product composition according to claim 31, wherein said carrier constituent has a vapor pressure of at least 2.0 mm Hg at 25° C., a boiling point in the range of 25–150° C., and a density in the range of 0.7 to 0.99 g/cc at 25° C., and is water insoluble.

47. A particulate soluble coffee product composition according to claim 46, wherein said carrier constituent has a vapor pressure of at least 5.0 mm at 25° C., and a density in the range of 0.8 to 0.95 g/cc at 25° C.

48. A particulate soluble coffee product composition according to claim 31, wherein said carrier constituent is present in said composition in an amount of greater than 50% by weight based on the total weight of the said carrier constituent and said aroma constituent.

49. A particulate soluble coffee product composition according to claim 31, wherein said carrier comprises at least one member selected from the group consisting of monoterpene hydrocarbons, esters, and alkyl furans.

50. A particulate soluble coffee product composition according to claim 31, wherein said volatile carrier comprises at least one member selected from the group consisting of d-limonene, 2-ethylfuran, 2-methylfuran, 2,5-dimethylfuran, and ethyl acetate.

51. A particulate soluble coffee product composition according to claim 31, wherein said carrier constituent comprises a plurality of volatile organic compounds, and wherein said carrier compounds are miscible with one another.

52. A particulate soluble coffee product composition according to claim 51, wherein said plurality of carrier compounds belong a common chemical classification group.

* * * * *